Sept. 5, 1939.　　　　A. B. POOLE　　　　2,171,988
SYNCHRONOUS ELECTRIC MOTOR STRUCTURE
Filed April 29, 1938　　　3 Sheets-Sheet 1
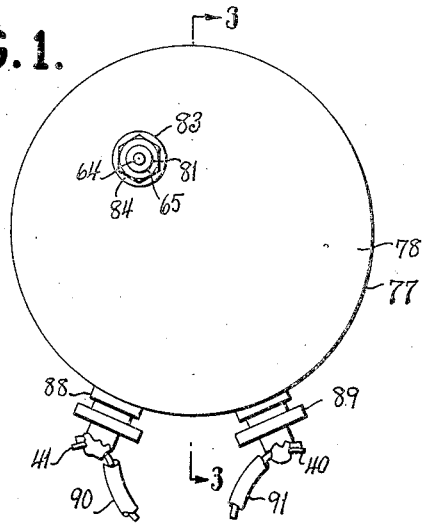
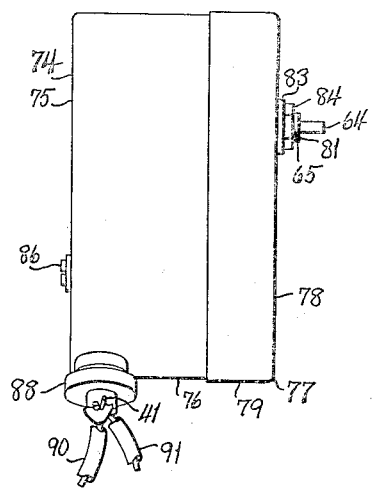
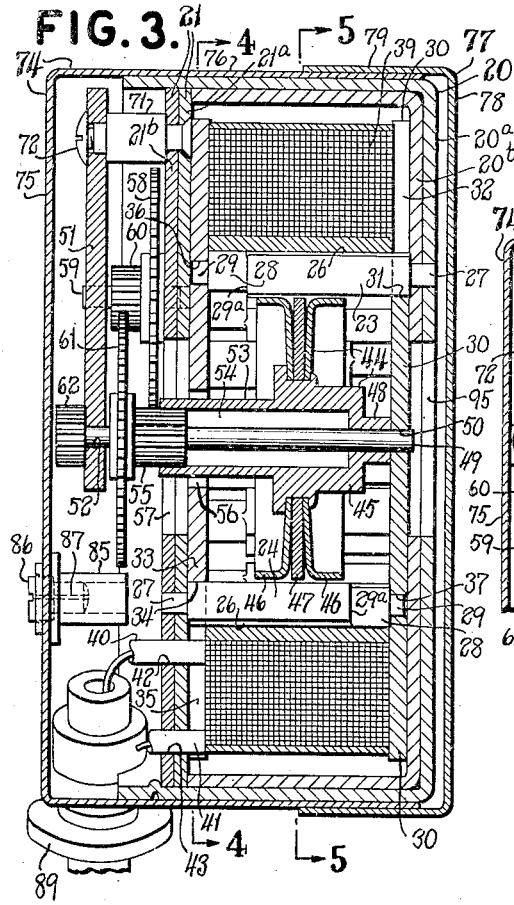
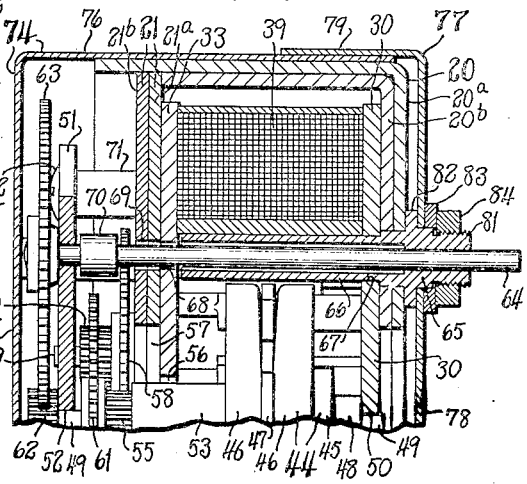
INVENTOR
Arthur B. Poole
BY
ATTORNEY Sept. 5, 1939.  A. B. POOLE  2,171,988
SYNCHRONOUS ELECTRIC MOTOR STRUCTURE
Filed April 29, 1938  3 Sheets-Sheet 2

INVENTOR
Arthur B. Poole
BY
*Seymour Earle Nichols*
ATTORNEY

Sept. 5, 1939. A. B. POOLE 2,171,988
SYNCHRONOUS ELECTRIC MOTOR STRUCTURE
Filed April 29, 1938   3 Sheets-Sheet 3

INVENTOR
Arthur B. Poole
BY
ATTORNEY

Patented Sept. 5, 1939

2,171,988

UNITED STATES PATENT OFFICE 2,171,988

SYNCHRONOUS ELECTRIC MOTOR STRUCTURE

Arthur B. Poole, Bristol, Conn., assignor to The E. Ingraham Company, Bristol, Conn., a corporation of Connecticut Application April 29, 1938, Serial No. 204,932

13 Claims. (Cl. 172—278)

This invention relates to improvements in synchronous-electric motor-structures, and is particularly concerned with a synchronous-electric motor-structure for use in propelling clocks and other time-instruments.

One of the objects of the present invention is to provide an improved synchronous electric motor-structure in which elements for performing electromagnetic functions of the motor, are so formed and arranged as to perform mechanical functions, including supporting functions, with respect to other elements of the structure, to reduce the number of parts required, and to secure a compact and sturdy structure.

Another object of this invention is, in an improved synchronous-electric motor-structure, to arrange elements performing electromagnetic functions of the motor in such selected structural relationship as to minimize or substantially eliminate vibration and hum, and to secure more nearly noiseless operation of the electric motor, particularly when the motor is operated by alternating electric current.

A still further object of this invention is to provide relatively-large areas of bearing-surfaces for rotating parts to reduce wear and to relieve torsional strains, and to provide means for preventing axial displacement of parts, to secure a synchronous motor-structure which is substantially free of chatter and other objectionable noise.

Still another object of the present invention is, in an improved synchronous-electric motor-structure, as described, to so arrange elements performing electromagnetic functions of the motor, that these elements also serve as positioning and spacing means to position and orient other elements of the structure, particularly with respect to moving parts, whereby, during operation of the motor, interference with, or sticking, of moving parts, does not occur.

With the above and other objects in view, as will appear to those skilled in the art from the present disclosure, this invention includes all features in the said disclosure which are novel over the prior art and which are not claimed in any separate application.

In the accompanying drawings, in which certain modes of carrying out the invention are shown for illustrative purposes:

Fig. 1 is a view in front-end elevation of a synchronous-electric motor-structure embodying the present invention;

Fig. 2 is a view of the motor-structure in side elevation;

Fig. 3 is a transverse sectional view, taken on the line 3—3 of Fig. 1;

Fig. 6 is a fragmentary sectional view taken on line 6—6 of Fig. 4;

Figure 4:
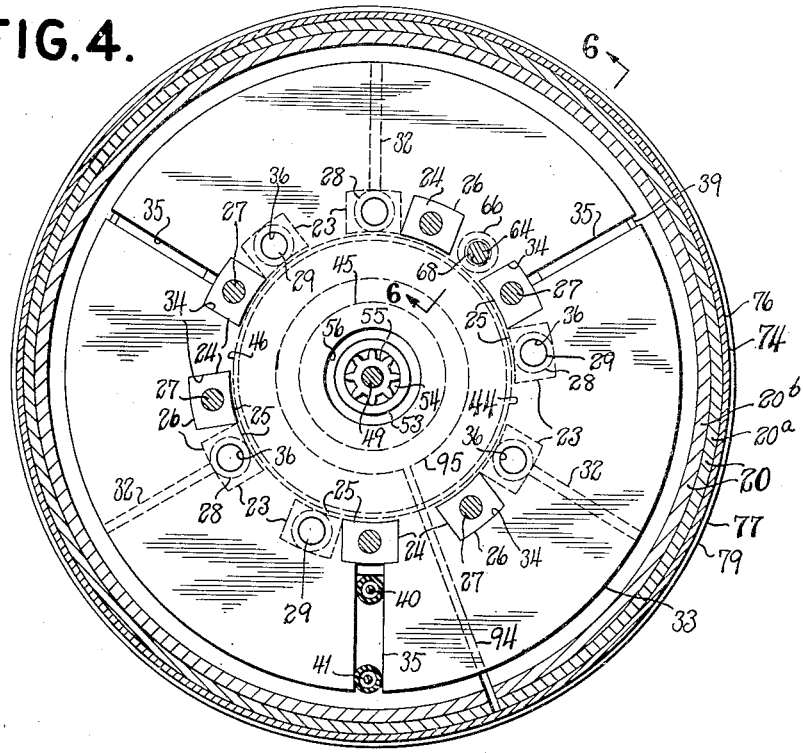
Fig. 4 is a sectional view taken on the line 4—4 of Fig. 3.

Generally, the particular self-starting synchronous-electric motor-structure herein chosen for illustration, embodies an energizing-coil, current-supplying means for the said energizing-coil, a field-structure having salient-poles to be magnetized by the energizing-coil, and one or more shading-disks formed to short-circuit some of the salient-poles, a rotor to be driven by magnetic-flux applied to the field-structure, and a speed-reducing gear-train connected with and driven by the rotor.

And, it is a purpose of the present invention, that the described elements which perform the electromagnetic functions of the synchronous-electric motor, be so formed and arranged in such structural relationship to each other as to also perform mechanical functions, whereby a compact and sturdy structure requiring few parts is secured, in which the elements cooperate to prevent vibration and hum, and to avoid interference with moving parts.

In the preferred embodiment of the invention herein chosen for illustration, the field-structure of the synchronous-electric motor-structure comprises two oppositely-arranged complemental magnetic portions, which will be referred to in this description, as pole-units. The pole-units include a cup-shaped pole-unit generally designated by the reference character 20, and a complementary disk-like pole-unit designated as a whole by the reference character 21. The pole-unit 20 includes a relatively-deep outer cup-shaped member 20a and a relatively-shallow cup-shaped inner member 20b, tightly fitted within the said outer member 20a. The disk-like pole-unit 21 comprises inner and outer disks 21a and 21b, respectively, which fit within the open forward end of the outer cup-shaped member 20a of the cup-shaped pole-unit 20 with the inner face of disk 21a bearing against the outer edge of the inner cup-shaped member 20b of the said cup-shaped pole-unit 20, as is particularly well shown in Figs. 3 and 6. The cup-shaped members of the cup-shaped pole-unit 20 and the disks of disk-like pole-unit 21 are composed of suitable magnetic material, such, for instance, as soft iron, silicon steel, or the like.

The disk-like pole-unit 21 and the end-wall of the cup-shaped pole-unit 21 may be viewed as spaced-apart magnetic portions which are magnetically-connected together and are spaced apart by the annular side-wall of the said pole-unit 20.

Projecting rearwardly from a disk-like portion or end-wall of the cup-shaped pole-unit 20 is an annularly-arranged series of bar-like salient-poles 23 (six, more or less) formed of suitable magnetic material and arranged in (three, more or less) relatively-closely-spaced pairs around the axis of the structure formed by the complemental pole-units 20 and 21, with relatively-wide gaps between the respective pairs of salient-poles and the individual salient-poles of each pair relatively-close together. In a similar manner, the disk-like pole-unit 21 is provided with a corresponding annular series of bar-like, but oppositely-projecting, salient-poles 24, also formed of magnetic material, and like the salient-poles 23 before referred to, arranged in pairs with a relatively-wide gap between the respective pairs and with the individual salient-poles of each pair in relatively-close proximity to each other. The pairs of salient-poles of one pole-unit fit into the relatively-wide gaps between the pairs of salient-poles of the complemental pole-unit, as will be apparent by reference to Figs. 4 and 5.
The salient-poles 23 and 24 correspond to each other in size and form, so as to be interchangeable for the purpose of economy of manufacture and each of said salient-poles throughout the major portion of its length is of substantially-rectangular form in cross-section, and along this portion of its length each of the salient-poles is formed with a slightly-concave inner face at 25, and a slightly convex outer face at 26, for purposes to more fully appear.
Each of the salient-poles 23 and 24 is formed at one end with a cylindrical shank 27, and the disk-like portion comprising the end-wall of the cup-shaped pole-unit 20 and the disks of the disk-like pole-unit 21, are each formed with suitable perforations for receiving the shank end of the salient-poles 23 and 24, respectively, with a drive fit to firmly anchor the salient-poles in the respective pole-units. Each of the salient-poles 23 and 24, for a purpose about to be described, is also formed at its end opposite its shank 27 with a relatively-large cylindrical portion 28 and a relatively-small diameter cylindrical stabilizing-tenon 29.

From the foregoing it will be clear, that when the complemental pole-units are assembled, the cup-shaped members of the cup-shaped pole-unit 20 and the disks of the disk-like pole-unit 21 cooperate to provide magnetic frames for the salient-poles 23 and 24. Also, that by means of perforations provided in the disk-like portion comprising the end-wall of the cup-shaped pole-unit 20 and in the disks of the disk-like unit, and by the cylindrical shanks 27 of the salient-poles, these elements cooperate to perform the mechanical function of providing anchorage for the salient-poles 23 and 24 in the pole-units 20 and 21, respectively, supporting the salient-poles, and positioning the salient-poles in such manner, that in assembling the pole-units, the pairs of salient-poles of each of the pole-units fit between the salient-poles of the complemental pole-unit.

In the embodiment of the invention illustrated each of the pole-units 20 and 21 has located adjacent it, means for controlling the flow of magnetic flux in certain of the salient-poles of its respective pole-unit to provide a rotating-field effect. In accordance with the present invention, these means are so formed and arranged as to also perform mechanical functions, including supporting functions in the motor-structure.

Figure 10:
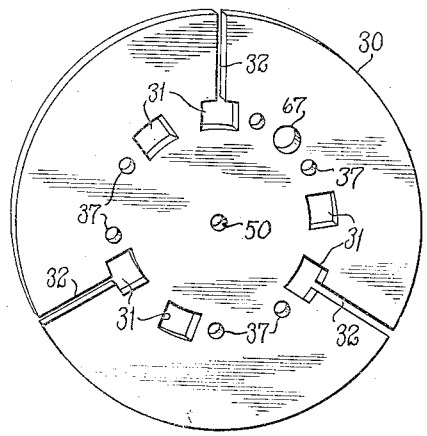
Fig. 10 is a perspective view of the shading-disk of the cup-shaped pole-unit.
Figure 11:
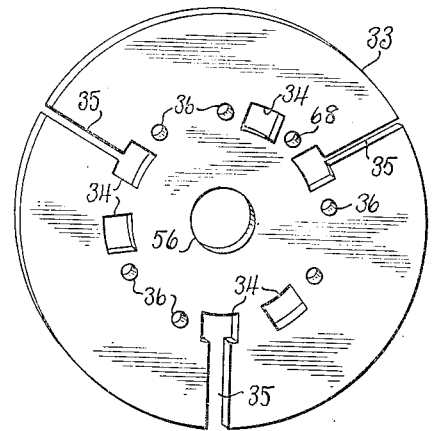
Fig. 11 is a perspective view of the shading-disk of the disk-like pole-unit.

Positioned against the disk-like inner face of the end-wall of the inner cup-shaped member 20b of the pole-unit 20 is a shading-disk 30 formed of copper or other suitable high electro-conductive material, and formed with an annular series of substantially-rectangular perforations 31. The rectangular perforations of the shading-disk 30 are so located about the face of the said disk as to register with the salient-poles 23 of the cup-shaped pole-unit 20, and are shaped to snugly fit over the rectangular base portion of the said salient-poles 23. Each alternate polygonal perforation 31 of shading-disk 30 is intersected by a radial slot at 32, as shown, see Figs. 5 and 10.

Located against the inner face of the disk-like pole-unit 21 is another shading-disk 33, corresponding in its main features and functions to the shading-disk 30 of the pole-unit 20. The shading-disk 33 is also provided with a series of polygonal perforations 34, which are located to register with the salient-poles 24 of the pole-unit 21, and which are shaped to snugly fit about the substantially-rectangular base portion of the salient-poles 24. Each alternate polygonal perforation 34, in the shading-disk 33 is also intersected by a radial slot 35, extending inwardly from the outer edge of the said shading-disk.

The described arrangement provides a set of alternate perforations 31 and 34 in the shading-disks 30 and 33, respectively, which are intersected by the radial slots 32 and 33 of the respective shading-disks, and an intermediately-arranged set of perforations 31 and 34 in the shading-disks 30 and 33, which are not intersected by radial slots.

The flow of induced current in the said shading-disks around each of the salient-poles passing through one of the alternately-arranged intersected perforations of each of the shading-disks is interrupted by the said radial slots and the circuit therefor is not complete. Around each of the intermediately-arranged perforations of the shading-disks where the material of the shading-disks is electrically continuous, a complete electrical path is provided for the flow of induced current around each of the salient-poles passing through each of the said perforations. The magnetic flux flowing through the salient-poles which pass through the intermediately-arranged non-intersected perforations will be delayed and will lag with respect to the magnetic flux flowing through the salient-poles passing through the alternately-arranged intersected perforations of each of shading-disks 30 and 33. By this arrangement a rotating-field effect is provided in the motor-structure which will have a turning effect upon a rotor-unit to be later described.

As has been described, each shading-disk 30 and 33 is formed with perforations 31 and 34, respectively, which are aligned with and are specially shaped to fit snugly about the salient-poles of its adjacent pole-unit. By this arrangement, each shading-disk is carried on and supported by salient-poles of its adjacent pole-unit; and each shading-disk, in turn, snugly fitted about the salient-poles of its pole-unit engages and provides supplemental support for the said salient-poles at the ends thereof which are anchored in the respective adjacent pole-units.

Another feature of the invention is to so form and arrange the salient-poles and the shading-disks, that the shading-disk of each of the said pole-units cooperates and provides anchoring support for the projecting or otherwise free ends of the salient-poles of the oppositely-arranged complemental pole-unit.

As has been described, each of the said salient-poles is formed at the end opposite its shank 27 with a relatively-large cylindrical portion 28 and with a relatively-small diameter cylindrical stabilizing-tenon 29, which latter is slightly tapered at its end, and between which and the said portion 28, a thrust-shoulder 29a is provided. The shading-disk 33, as shown, is formed with a second annular series of perforations 36, and the shading-disk 30 is provided with a second annular series of perforations 37. The perforations 36 of the shading-disk 33 and the perforations 37 of the shading-disk 30 are arranged in pairs around the face of and between the pairs of substantially-rectangular perforations 34 and 31 of the respective shading-disks 33 and 30. In the shading-disk 33 the perforations 36 are arranged to align with the tapered stabilizing-tenons 29 of the salient-poles 23 of the cup-shaped pole-unit 20. In the shading-disk 30 the perforations 37 are arranged to align with the tapered stabilizing-tenons 29 of the salient-poles 24 of the disk-like pole-unit 21. The tapered tenons 29 of the salient-poles of each of the pole-units are forced with a drive-fit into the corresponding perforations of the shading-disk adjacent the oppositely-arranged pole-unit, with the outer faces of the thrust-shoulder 29a of the salient-poles of each pole-unit bearing against the inner face of the shading-disk of the oppositely-arranged pole-unit.

The described structural arrangement enables several advantages to be secured. The salient-poles of each of the pole-units are firmly anchored in the end-wall of the associated pole-unit, the snug-fitting shading-disk of each pole-unit provides supplemental support at the ends of the salient-poles anchored in the end-wall of each pole-unit; and the opposite projecting ends of the salient-poles of each of the pole-units are securely anchored in the shading-disk of the opposite pole-unit by means of the tenons and thrust-shoulders of the salient-poles, whereby the salient-poles are stabilized at opposite ends to prevent vibration and are provided with thrust-shoulders 29a which assist in holding the disk-like pole-unit 21 in spaced relationship with respect to the cup-shaped pole-unit 20.

Between the shading-disks 30 and 33 of the pole-units 20 and 21, respectively, there is formed a chamber across which the salient-poles of each of the pole-units project to form an annular frame. The frame formed by the magnetic salient-poles serves to substantially enclose a rotor-unit and to support and space radially from such rotor-unit, an energizing-coil 39.

As shown, the energizing-coil 39 is of ring-like form and is supported on the outer convexly-curved faces 26 of the annular series of salient-poles 23 and 24. The said energizing-coil 39 is provided with two insulated leads 40 and 41 which are arranged to be connected to suitable terminals, as will be later described. In the form of the invention illustrated, the arrangement is simplified by enlarging one of the radial slots 35 in the shading-disk 33 to provide for the passage of the insulated leads 40 and 41 rearwardly therethrough, and the disk-like pole-unit 21 is provided with openings 42 and 43 adjacent the enlarged slot 35, through which openings the leads 40 and 41 pass.

Enclosed within the frame formed by the annularly-arranged salient-poles 23 and 24 is a rotor-unit generally designated by the reference character 44. The said rotor-unit comprises a rotor-hub 45 which is preferably made of brass or the like, and upon which is rigidly mounted a pair of corresponding but oppositely-facing cup-shaped rotor-elements 46—46 which are preferably formed of permanent-magnet steel or its equivalent, and which are spaced from each other by a salient-poled rotor-member 47 which may be conveniently made of soft iron or other non-permanent magnetic material. The cup-shaped rotor-elements 46—46 are smooth upon their periphery and are not provided with geometrically-salient poles, but owing to their permanent-magnet character can receive magnetic "spottings", so to speak, which will be impressed upon them by the adjacent salient-poles of the stator-structure, in accordance with principles well understood in the art.

The rotor-hub 45 is provided at its forward end with a sleeve-like bearing portion 48, which bears upon the adjacent surface of a center-arbor 49, and the center-arbor 49, in turn, is journaled at its forward end in a bearing-opening 50 formed in the shading-disk 30 adjacent the end-wall of the cup-shaped pole-unit 20. Located rearwardly of and in spaced relationship to the disk-like pole unit 21 is a bearing-plate 51, which is provided with a bearing-opening 52 for the rear end of the said center-arbor 49. The rear end of the rotor-hub 45 is also provided with a sleeve-like portion 53, which extends rearwardly of the said rotor-hub and an axial passage 54 extends through the sleeve 53 and through the main adjacent portion of the rotor-hub 45, as is clearly shown in Fig. 3. The diameter of the axial passage 54 is considerably larger than the diameter of the center-arbor 49 which extends therethrough, and the sleeve 53 through which the said axial passage extends, receives at its rear end, with a drive fit, the forward end of a pinion 55. This pinion 55 bears with freedom for rotation, upon the said center-arbor 49 and permits the access of oil to the interior of rotor-hub 45 through the slots between its gear-teeth.

As thus constructed and arranged, the rotor-hub 45 bears at its forward end upon the independently-rotatable center-arbor 49 by virtue of the sleeve 48 of the said rotor-hub, and it also bears at its rear end upon the said center-arbor through the pinion 55 which latter to all intents and purposes, is a part of the said rotor-hub. The center-arbor 49 on which the rotor-hub bears, in turn, is supported for rotation at one end in the bearing-plate 51 and at its opposite end is journaled in the shading-disk 30.

The shading-disk 33 and the disk-like pole-unit 21 are provided with clearance-openings 56 and 57 respectively, and the sleeve portion 53 of rotor-hub 45 which carries the pinion 55 at its rear end, projects rearwardly through the said clearance-openings 56 and 57.

The pinion 55 meshes into and drives a gear-wheel 58 (see Fig. 3) which is mounted for rotation upon a shaft 59 supported at its respective ends in the disk-like pole-unit 21 and in the bearing-plate 51. The said gear-wheel 58 rigidly carries a pinion 60 which in turn meshes into and drives a gear-wheel 61 staked or otherwise secured to the center-arbor 49 at a point intermediate the rear end of the pinion 55 of the rotor-hub 45 and the inner face of the bearing-plate 51. The extreme rear portion of the center-arbor 49 at the rear of the bearing-plate 51 has staked or otherwise secured to it, a pinion 62 which is arranged to mesh with and drive a gear-wheel 63 at the rear of the bearing-plate 51 (see Fig. 6). The gear-wheel 63 is staked or otherwise secured to the rear end of a power-output shaft 64. The construction and arrangement of the parts is such, that the power-output shaft 64 is accommodated between spaced salient-poles of the pole-units, free of interference, and bearing-supports for the said power-output shaft are provided by elements of the pole-units 20 and the plate 51.

As shown (see Fig. 6), the rear end of the power-output shaft 64 is journaled in the bearing-plate 51 and its front portion is journaled in the forward portion of a bearing-bushing 65 which extends through and is rigidly mounted in the disk-like end-wall of the cup-shaped pole-unit 20. The said bearing-bushing 65 is formed with a relatively-slender, rearwardly-extending guard-tube 66. The shading-disk 30 adjacent the cup-shaped pole-unit 20 is formed with a clearance-opening 67, as is clearly shown in Fig. 10, and the guard-tube 66 extends through the said clearance-opening 67 and into a position closely adjacent the inner face of the shading-disk 33 of the disk-like pole-unit 21 (see Fig. 6).

The power output shaft 64 extends rearwardly through the guard-tube 66, and passes through aligned openings 68 and 69 provided in the shading-disk 33 and in the disk-like pole-unit 21, respectively.

Arranged between the outer face of the disk 21b of the disk-like unit 21, and the bearing-plate 51, is a collar 70 for the power-output shaft 64, which serves to prevent undue rearward axial displacement of the said power-output shaft. The bearing-plate 51 in which the rear end of the power-output shaft 64 is journaled is secured to and held in spaced relationship with respect to the disk-like pole-unit 21 by means of pillars 71 to the rear end of which the bearing-plate 51 is attached by means of screws 72 or the like (see Fig. 3). The guard-tube 66 (preferably formed of brass), which projects across the field-structure to a position adjacent the shading-disk 33, encloses the power-output shaft 64, and the said guard-tube 66 and its enclosed power-output shaft are, as described, accommodated between spaced salient-poles of the pole-units.

In accordance with the principles of the invention, the shading-disks 30 and 33, which, as described, perform electro-magnetic functions, and each of which also carries out mechanical functions including serving as a stabilizer element for the salient-poles of its pole-unit, and as a stabilizer member for the otherwise free ends of the salient-poles of the complementary pole-unit, and which also support elements of the gear-train, are so selected and arranged as to effectively dampen vibration of the end-walls of the respective pole-units. For this purpose the shading-disks 30 and 33 are each composed of material which has high electro-conductive value, and which has a different period of vibration, or is relatively non-resonant, with respect to the adjacent magnetic portions against which they respectively seat. Each of the non-resonant shading-disks is seated snugly on the salient-poles of its pole-unit directly next to the said pole-units, and in this manner each of the said shading-disks also serves to materially dampen vibration and eliminate hum, and to secure more nearly noiseless operation of the motor-structure.

The entire motor-structure, except the forward the end of the bearing-bushing 65 and the forward end of the power-output shaft 64 is, preferably, enclosed within a two-part housing, which can, if desired, be made of relatively-light sheet-steel, or the like. The said housing includes a relatively-deep cup-shaped member generally designated by the reference character 74 and having a substantially-flat rear end-wall 75, and a deep annular flange 76. The forward, or open, end of the cup-shaped housing 74 is closed by a flanged housing-cap, designated as a whole by the reference numeral 77, and which includes a substantially-flat front end-wall 78 and a relatively-shallow rearwardly-projecting annular flange 79, which fits over the exterior of the adjacent end of the annular flange 76 of the main housing-member 74.

The front end-wall 78 of the cap 77 fits over the externally threaded forward end 81 of the bearing-bushing 65, and is held in seated engagement with an annular flange 82 on the said bearing-bushing by means of a washer 83 and a nut 84 upon the portion 81 of the said bearing-bushing. With this arrangement, oil contained in the housing is guarded against leakage.

Figure 5:
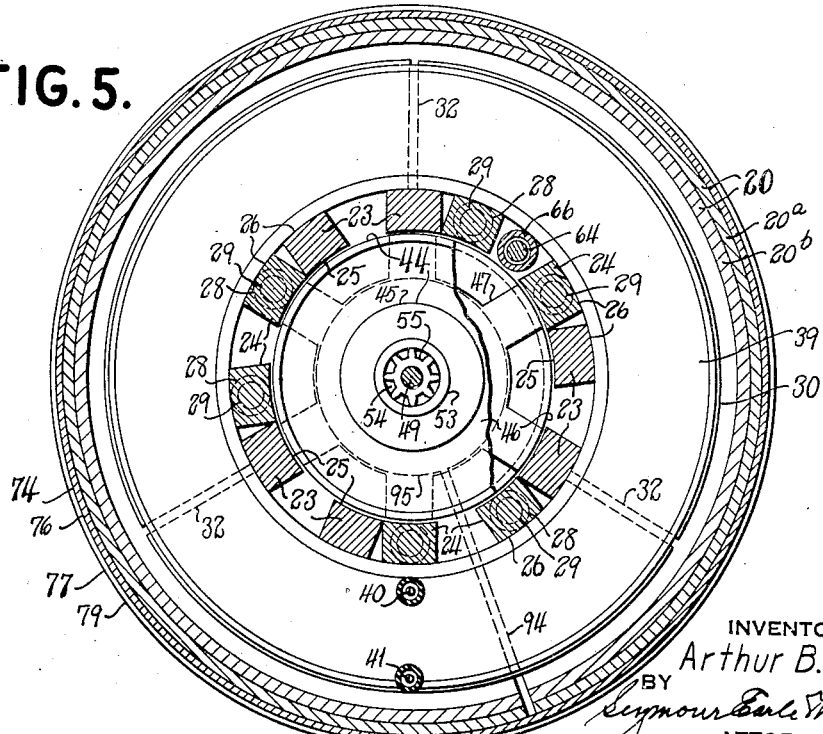
Fig. 5 is another sectional view taken on the line 5—5 of Fig. 3.

Preferably, the rear end-wall 75, as shown in Figs. 3 and 4, is provided with a bushing 85 through which oil may be introduced into the interior of the housing, and which is sealed against the escape of oil by means of a closure-screw 86 having a small vent passage 87 therein.

Mounted in the annular flange portion 76 of the main housing member 74 are terminals 88 and 89, to which the leads 40 and 41 of energizing-coil 39 are respectively connected and to which are soldered respectively supply-wires 90 and 91 leading to any suitable source of current supply, such for instance as 110 volt 60 cycle alternating-current.

Figure 7:
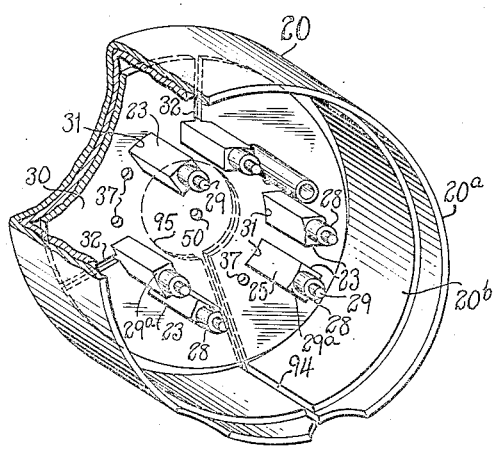
Fig. 7 is a perspective view partly in section, of the cup-shaped pole-unit.
Figure 8:
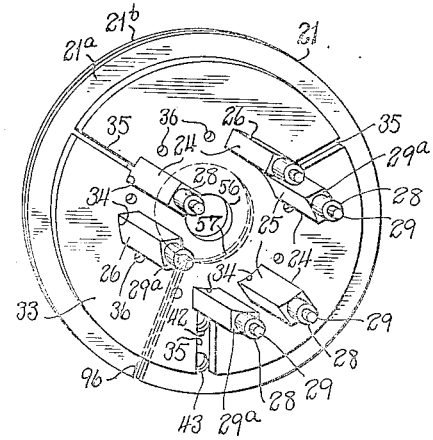
Fig. 8 is a perspective view of the disk-like pole-unit.
Figure 9:
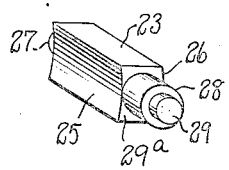
Fig. 9 is a perspective view of one of the bar-like salient poles.

It will be observed (Fig. 7) that the cup-shaped members 20a and 20b of the cup-shaped pole-unit 20 are provided, as at 94, with slots which extend radially from the central clearance-opening 95 through both the end-walls and the flange-portions of the cup-shaped members 20a and 20b of the said pole-unit. The disk-like pole-unit 21 is also provided with a radial slot 96 (Fig. 8). By this arrangement, the flow of stray induced current in the cup-shaped pole-unit 20 and in the disk-like pole-unit 21, is minimized.

The arrangement of the parts of the structure is such that hum or sounds caused by vibration or chatter are not given off by the housing. It will be apparent that by anchoring one end of the salient-poles of each of the pole-units in a disk-like portion of a pole-unit, providing supplemental support for the salient-poles by means of the shading-disk of the unit, and anchoring the projecting ends of the salient-poles of each pole-unit in the shading-disk of the opposite pole-unit, the salient-poles are stabilized against vibration and held against axial displacement. The salient-poles do not transmit vibratory movements to the pole-units; nor do the salient-poles, by axial displacement, cause bodily movements of the said pole-units. Such vibratory movements as may be developed in the end-walls of the pole-units are damped by the provision of shading-disks. In turn, the magnetic portions against which the shading-disks seat do not transmit vibrations to, nor do they by bodily movement tend to displace, other elements of the structure.

The above and other arrangements described herein which serve to further reduce vibration, hum, chatter and wear and to promote the stability of the structure, all contribute to secure a compact and sturdy structure, which will be substantially noiseless in operation. It will be observed that the invention is primarily directed to a synchronous electric motor for driving electric clocks or other time instruments, and when used for this purpose the quietness of the operation is an especially desirable feature.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A synchronous electric motor-structure, including in combination: an energizing-coil; a field-structure magnetizable by the said energizing-coil and comprising a first magnetic-portion, a second magnetic-portion spaced from the said first magnetic-portion, a first salient pole secured at its inner end to and projecting axially from the said first magnetic-portion toward the said second magnetic-portion, a second salient pole secured at its inner end to and projecting axially in the opposite direction from the said second magnetic-portion toward the said first magnetic-portion, first short-circuiting means located adjacent the secured inner end of and extending around the said first salient pole, and second short-circuiting means located adjacent the secured inner end of and extending around the said second salient pole, the said first and second short-circuiting means being respectively individual to the said first and second magnetic-portions with respect to electrical short-circuiting and being respectively engaged with the outer ends of the oppositely-projecting second and first salient poles to provide mechanical support therefor, and the oppositely-projecting salient poles providing mounting-space between the respective inner and outer anchored ends thereof; and a rotor positioned to be driven by the magnetic-flux applied to the said field-structure.

2. A synchronous electric motor-structure, including in combination: an energizing-coil; a field-structure magnetizable by the said energizing-coil and comprising a first magnetic-portion, a second magnetic-portion spaced from the said first magnetic-portion, a first group of salient poles secured at the inner ends thereof to and projecting axially from the said first magnetic-portion toward the said second magnetic-portion, a second group of salient poles secured at the inner ends thereof to and projecting axially in the opposite direction from the said second magnetic-portion toward the said first magnetic-portion, first short-circuiting means located adjacent the secured inner ends of and extending around certain of the said first group of salient poles to provide a rotating-field effect, and second short-circuiting means located adjacent the secured inner ends of and extending around certain of the said second group of salient poles to provide a rotating-field effect, and the said first and second short-circuiting means being respectively engaged with the outer ends of the oppositely-projecting second and first groups of salient poles to provide mechanical support therefor, and the oppositely-projecting salient poles providing mounting-space between the respective inner and outer anchored ends thereof; and a rotor positioned to be driven by the magnetic-flux applied to the said field-structure.

3. A synchronous electric motor-structure, including in combination: an energizing-coil; a field-structure magnetizable by the said energizing-coil and comprising a first disk-like magnetic-portion, a second disk-like magnetic-portion spaced from the said first disk-like magnetic-portion, a first annular series of salient poles secured at the inner ends thereof to and projecting axially from the said first disk-like magnetic-portion toward the said second disk-like magnetic-portion, a second annular series of salient poles secured at the inner ends thereof to and projecting axially in the opposite direction from the said second disk-like magnetic-portion toward the said first disk-like magnetic-portion, a first disk-like short-circuiting member located adjacent the secured inner ends of the said first annular series of salient poles and providing a low-resistance electrical path around alternate salient poles thereof and a second disk-like short-circuiting member located adjacent the secured inner ends of the said second annular series of salient poles and providing a low-resistance electrical path around alternate ones thereof, and the said first and second disk-like short-circuiting members being respectively engaged with the outer ends of the oppositely-projecting second and first annular series of salient poles to provide mechanical support therefor, and the oppositely-projecting salient poles of the said annular series providing mounting-space between the respective inner and outer anchored ends thereof; and a rotor positioned to be driven by the magnetic-flux applied to the said field-structure.

4. A synchronous electric motor-structure, including in combination: an energizing-coil; a field-structure magnetizable by the said energizing-coil and including a cup-shaped magnetic-member having an end wall comprising a first magnetic-portion, a disk-like magnetic-member extending across the opposite open end of the said cup-shaped magnetic-member in spaced relationship with respect to the end-wall thereof and comprising a second magnetic-portion, a first salient pole secured at its inner end to and projecting axially from the said cup-shaped magnetic-member toward the said disk-like magnetic-member, a second salient pole secured at its inner end to and projecting axially in the opposite direction from the said disk-like magnetic-member toward the end-wall of the said cup-shaped magnetic-member, first short-circuiting means located adjacent the end-wall of the said cup-shaped magnetic-member and extending around the said first salient pole, and second short-circuiting means located adjacent the said disk-like magnetic-member and extending around the said second salient pole, the said first and second short-circuiting means being respectively individual to the said first and second magnetic-portions with respect to electrical short-circuiting and being respectively engaged with the outer ends of the oppositely-projecting second and first salient poles to provide mechanical support therefor, and the oppositely-projecting salient poles providing mounting-space between the respective inner and outer anchored ends thereof; and a rotor positioned to be driven by the magnetic-flux applied to the said field-structure.

5. A synchronous electric motor-structure, including in combination: an energizing-coil; a field-structure magnetizable by the said energizing-coil and including a cup-shaped magnetic-member having an end-wall comprising a first magnetic-portion, a disk-like magnetic-member extending across the opposite open end of the said cup-shaped magnetic-member in spaced relationship with respect to the end-wall thereof and comprising a second magnetic-portion, a first group of salient poles secured at the inner ends thereof to and projecting axially from the end-wall of the said cup-shaped magnetic-member toward the said disk-like magnetic-member, a second group of salient poles secured at the inner ends thereof to and projecting axially in the opposite direction from the said disk-like magnetic-member toward the end-wall of the said cup-like magnetic-member, first short-circuiting means located adjacent the end-wall of the said cup-shaped magnetic-member and extending around certain of the said first group of salient poles to provide a rotating field effect, and second short-circuiting means located adjacent the said disk-like magnetic-member and extending around certain of the said second group of salient poles to provide a rotating field effect, and the said first and second short-circuiting means being respectively engaged with the outer ends of the oppositely-projecting second and first groups of salient poles to provide mechanical support therefor, and the oppositely-projecting salient poles providing mounting-space between the respective inner and outer anchored ends thereof; and a rotor positioned to be driven by the magnetic-flux applied to the said field-structure.

6. A synchronous electric motor-structure, including in combination: an energizing-coil; a field-structure magnetizable by the said energizing-coil and including a cup-shaped magnetic-member having an end-wall comprising a first magnetic-portion, a disk-like magnetic-member extending across the opposite open end of the said cup-shaped magnetic-member in spaced relationship with respect to the end-wall thereof and comprising a second magnetic-portion, a first annular series of salient poles secured at the inner ends thereof to and projecting axially from the end-wall of the said cup-shaped magnetic-member toward the said disk-like magnetic-member, a second annular series of salient poles secured at the inner ends thereof to and projecting axially in the opposite direction from the said disk-like magnetic-member toward the end-wall of the said cup-shaped magnetic-member, a first disk-like short-circuiting member located adjacent the end-wall of the said cup-shaped magnetic-member and providing a low-resistance electrical path around alternate salient poles of the said first annular series thereof, and a second disk-like short-circuiting member located adjacent the said disk-like magnetic-member and providing a low-resistance electrical path around alternate ones of the said second annular series of salient poles thereof, and the said first and second disk-like short-circuiting members being respectively engaged with the outer ends of the oppositely-projecting second and first annular series of salient poles to provide mechanical support therefor, and the oppositely-projecting salient poles of the said annular series providing mounting-space between the respective inner and outer anchored ends thereof; and a rotor positioned to be driven by the magnetic-flux applied to the said field-structure.

7. A synchronous electric motor-structure, including in combination: an energizing-coil; a field-structure magnetizable by the said energizing-coil and comprising a first magnetic-portion, a second magnetic-portion spaced from the said first magnetic-portion, a first salient pole secured at its inner end to and projecting axially from the said first magnetic-portion toward the said second magnetic-portion, and having a stabilizing-tenon at its outer end, a second salient pole secured at its inner end to and projecting axially in the opposite direction from the said second magnetic-portion toward the first magnetic-portion and also having a stabilizing-tenon at its outer end, first short-circuiting means located adjacent the secured inner end of and extending around the said first salient pole, and second short-circuiting means located adjacent the secured inner end of and extending around the said second salient pole, and the said first and second short-circuiting means being respectively individual to the said first and second magnetic-portions with respect to electrical short-circuiting, and being each provided with a socket to respectively receive the stabilizing-tenon at the outer end of the oppositely-projecting second and first salient poles to provide mechanical support therefor, and the oppositely-extending salient poles providing mounting-space between the respective inner and outer anchored ends thereof; and a rotor positioned to be driven by the magnetic-flux applied to the said field-structure.

8. A synchronous electric motor-structure, including in combination: an energizing-coil; a field-structure magnetizable by the said energizing-coil and comprising a first magnetic-portion, a second magnetic-portion spaced from the said first magnetic-portion, a first group of salient poles secured at the inner ends thereof to and projecting axially from the said first magnetic-portion toward the said second magnetic-portion and each provided at its outer end with a stabilizing-tenon, a second group of salient poles secured at the inner ends thereof to and projecting axially in the opposite direction from the said second magnetic-portion toward the said first magnetic-portion and each provided with a stabilizing-tenon at its outer end, first short-circuiting means located adjacent the secured inner ends of and extending around certain of the said first group of salient poles to provide a rotating field effect, and second short-circuiting means located adjacent the secured inner ends of and extending around certain of the said second group of salient poles to provide a rotating field effect, and the said first and second short-circuiting means being each provided with a plurality of sockets to respectively receive the stabilizing-tenons at the outer ends of the oppositely-projecting second and first groups of salient poles to provide mechanical support therefor, and the oppositely-projecting salient poles providing mounting-space between the respective inner and outer anchored ends thereof; and a rotor positioned to be driven by the magnetic-flux applied to the said field-structure.

9. A synchronous electric motor-structure, including, in combination: an energizing-coil; a field-structure magnetizable by the said energizing-coil and comprising a first disk-like magnetic-portion, a second disk-like magnetic-portion spaced from the said first disk-like magnetic-portion, a first annular series of salient poles secured at the inner ends thereof to and projecting axially from the said first disk-like magnetic-portion toward the said second disk-like magnetic-portion and each provided at its outer end with a stabilizing-tenon, a second annular series of salient poles secured at the inner ends thereof to and projecting axially in the opposite direction from the said second disk-like magnetic-portion toward the said first disk-like magnetic-portion and each provided at its outer end with a stabilizing-tenon, a first disk-like short-circuiting member located adjacent the secured inner ends of the said first annular series of salient poles and providing a low-resistance electrical path around alternate poles thereof, and a second disk-like short-circuiting member located adjacent the secured inner ends of the said second annular series of salient poles and providing a low-resistance electrical path around alternate poles thereof, and the said first and second short-circuiting means being each provided with an annular series of sockets to respectively receive the stabilizing-tenons at the outer ends of the oppositely-projecting second and first annular series of salient poles to provide mechanical support therefor, and the oppositely-projecting salient poles of the said annular series providing mounting-space between the respective inner and outer anchored ends thereof; and a rotor positioned to be driven by the magnetic flux applied to the said field-structure.

10. A synchronous electric motor-structure, including in combination: an energizing-coil; a field-structure magnetizable by the said energizing-coil and including a cup-shaped magnetic-member having an end-wall comprising a first magnetic-portion, a disk-like magnetic-member extending across the opposite open end of the said cup-shaped magnetic-member in spaced relationship with respect to the end-wall thereof and comprising a second magnetic portion, a first salient pole secured at its inner end to and projecting axially from the said cup-shaped magnetic-member toward the said disk-like magnetic-member and having a stabilizing-tenon at its outer end, a second salient pole secured at its inner end to and projecting axially in the opposite direction from the said disk-like magnetic-member toward the end-wall of the said cup-shaped magnetic-member and also provided at its outer end with a stabilizing-tenon, first short-circuiting means located adjacent the secured inner end of and extending around the said first salient pole, and second short-circuiting means located adjacent the secured inner end of and extending around the said second salient pole, and the said first and second short-circuiting means being respectively individual to the said first and second magnetic-portions with respect to electrical short-circuiting, and being each provided with a socket to respectively receive the stabilizing tenon at the outer end of the oppositely-projecting second and first salient poles to provide mechanical support therefor, and the oppositely-extending salient poles providing mounting-space between the respective inner and outer anchored ends thereof; and a rotor positioned to be driven by the magnetic flux applied to the said field-structure.

11. A synchronous electric motor-structure, including in combination: an energizing-coil; a field-structure magnetizable by the said energizing-coil and including a cup-shaped magnetic-member having an end-wall comprising a first magnetic-portion, a disk-like magnetic-member extending across the opposite open end of the said cup-shaped magnetic-member in spaced relationship with respect to the end-wall thereof and comprising a second magnetic-portion, a first group of salient poles secured at the inner ends thereof to and projecting axially from the end-wall of the said cup-shaped magnetic-member toward the said disk-like magnetic-member and each formed at its outer end with a stabilizing-tenon, a second group of salient poles secured at the inner ends thereof to and projecting axially in the opposite direction from the said disk-like magnetic-member toward the end-wall of the said cup-like magnetic-member and each provided at its outer end with a stabilizing-tenon, first short-circuiting means located adjacent the secured inner ends of and extending around certain of the said first group of salient poles to provide a rotating-field effect, and second short-circuiting means located adjacent the secured inner ends of and extending around certain of the said second group of salient poles to provide a rotating-field effect, and the said first and second short-circuiting means being each provided with a plurality of sockets to respectively receive the stabilizing-tenons at the outer ends of the oppositely-projecting second and first groups of salient poles to provide mechanical support therefor, and the oppositely-projecting salient poles providing mounting-space between the respective inner and outer anchored ends thereof; and a rotor positioned to be driven by the magnetic flux applied to the said field-structure.

12. A synchronous electric motor-structure, including in combination: an energizing-coil; a field-structure magnetizable by the said energizing-coil and including a cup-shaped magnetic-member having an end-wall comprising a first magnetic-portion, a disk-like magnetic-member extending across the opposite open end of the said cup-shaped magnetic-member in spaced relationship with respect to the end-wall thereof and comprising a second magnetic-portion, a first annular series of salient poles secured at the inner ends thereof to and projecting axially from the end-wall of the said cup-shaped magnetic-member toward the said disk-like magnetic-member and each provided at its outer end with a stabilizing-tenon, a second annular series of salient poles secured at the inner ends thereof to and projecting axially in the opposite direction from the said disk-like magnetic-member toward the end-wall of the said cup-shaped magnetic-member and each provided at its outer end with a stabilizing-tenon, a first disk-like short-circuiting member located adjacent the end-wall of the said cup-shaped magnetic-member and providing a low-resistance electrical path around each alternate salient pole of the said first annular series thereof, and a second disk-like short-circuiting member located adjacent the said disk-like magnetic-member and providing a low-resistance electrical path around alternate ones of the said second annular series of salient poles, and the said first and second short-circuiting means being each provided with an annular series of sockets to respectively receive the stabilizing-tenons at the outer ends of the oppositely-projecting second and first annular series of salient poles to provide mechanical support therefor, and the oppositely-projecting salient poles of the said annular series providing mounting-space between the respective inner and outer anchored ends thereof; and a rotor positioned to be driven by the magnetic flux applied to the said field-structure.

13. A synchronous electric motor-structure, including in combination: an energizing-coil; a field-structure magnetizable by the said energizing-coil and comprising a first magnetic-portion, a second magnetic-portion spaced from the said first magnetic-portion, a first group of salient poles secured at the inner ends thereof to and projecting axially from the said first magnetic-portion toward the said second magnetic-portion, a second group of salient poles secured at the inner end thereof to and projecting axially in the opposite direction from the said second magnetic-portion toward the said first magnetic-portion, first short-circuiting means located adjacent the secured inner ends of and extending around certain only of the said first group of salient poles to provide a rotating-field effect, and second short-circuiting means located adjacent the secured inner ends of and extending around certain only of the said second group of salient poles to provide a rotating-field effect; a rotor positioned to be driven by the magnetic-flux applied to the said field-structure; and a supporting-shaft for the rotor; the said short-circuiting means being also mechanically related to the motor-structure, the oppositely-projecting outer ends of all of the salient poles of the said first and second groups thereof being respectively engaged and supported by the said second and first short-circuiting means, and at least one of the said short-circuiting means being provided with a bearing-opening receiving and supporting the said supporting-shaft for the rotor.

ARTHUR B. POOLE.